United States Patent Office 3,293,937
Patented Dec. 27, 1966

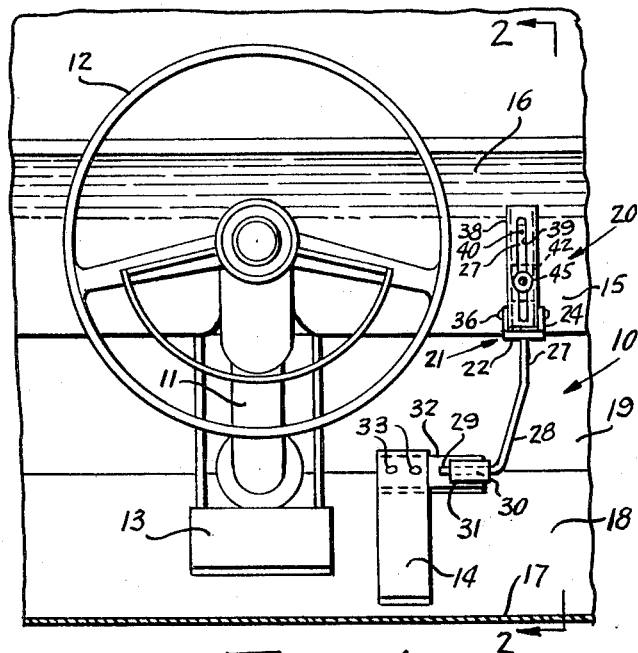

3,293,937
THROTTLE CONTROL
Edson F. Gardner, 1925 79th Ave.,
Vero Beach, Fla. 32960
Filed Jan. 11, 1965, Ser. No. 424,701
4 Claims. (Cl. 74—526)

This invention relates to a throttle control, and has as its primary object the provision of a means attached to the throttle of a conventional motor vehicle such as a car or truck whereby the vehicle may be maintained at a constant top speed.

A further object of the invention is the provision of a device of this character which, when the pressure on the accelerator pedal is released, in no way affects the slowing down of the vehicle.

Still another object of the invention is the provision of a device of this character which may be readily adjusted to different top speeds of the vehicle.

A further object of the invention is the provision of a device of this character by means of which a constant and steady top speed may be maintained without undue strain on the driver of the car.

Still another object of the invention is the provision of a device of this nature which serves to promote gasoline economy by maintaining the throttle in a constant position, as opposed to the relatively varying action which accompanies unrestrained foot action on the accelerator pedal.

Still another object of the invention is the promotion of oil economy, in that the oil of the vehicle is maintained substantially undiluted, when a rich mixture is not continually pumped into the cylinder chambers, such as occurs during constant pumping action on the accelerator.

A further object of the invention is the provision of a device of this character which may be attached to any existing motor vehicle with a minimum of time, effort, and expense, or which may be readily supplied as a component part of new vehicles.

A further object of the invention is the provision of a device of this character which is sturdy and durable in construction, reliable and efficient in operation, and relatively simple and inexpensive to manufacture, assemble, and utilize.

Other objects will in part be obvious and in part be pointed out as the description of the invention proceeds, and shown in the accompanying drawing wherein is disclosed a preferred embodiment of this inventive concept.

In the drawing:

FIGURE 1 is a top plan view of the interior of a portion of a motor vehicle, showing the device of the instant invention attached to the accelerator pedal;

FIGURE 2 is a sectional view taken substantially along the line 2—2 of FIGURE 1 as viewed in the direction indicated by the arrows;

FIGURE 3 is an enlarged front elevational view of one of the components of this device;

FIGURE 4 is a sectional view taken substantially along the line 4—4 of FIGURE 3 as viewed in the direction indicated by the arrows; and FIGURE 5 is an enlarged sectional view taken substantially along the line 5—5 of FIGURE 3 as viewed in the direction indicated by the arrows.

Similar reference characters refer to similar parts throughout the several views of the drawing.

Having reference now to the drawings in detail, there is generally indicated at 10 a fragment of the interior of a motor vehicle, the vehicle including the usual steering post 11, wheel 12, brake pedal 13, and conventional accelerator foot pedal 14. As illustrated, the vehicle also includes the usual dash 15 and dash deck 16, as well as a floor 17, and the normally inclined portion 18 extending between the floor and the fire wall 19.

All of the above elements are conventional, and are illustrated merely for the purpose of showing the relationship of the device in the instant invention thereto. The latter is generally indicated at 20, and includes a supporting bracket generally indicated at 21 including a plate 22, a rearwardly extending wall 23, and side flanges 24. The wall 23 is provided with apertures through which bolts 25 may be extended to secure the bracket to the dash 15. An opening 26 is provided in base 22, and a vertical portion 27 of an elongated rod extends through the opening. The rod also includes an angularly inclined portion 28 and a horizontal portion 29 extending in a direction perpendicular to the extension of portion 27. Portion 29 extends through bore 30 in a tubular support 31, which in turn is secured to a transversely extending support 32 which is bolted, as by means of bolts 33 to the upper or free end of the accelerator pedal 14. The arrangement is thus such that as the accelerator pedal 14 is moved upwardly or downwardly to control the flow of gas to the motor through the usual accelerator rod 35, horizontal portion 29 of the rod is similarly moved, which in turn causes vertical movement of the vertical portion 27 thereof.

A hinge pin 36 extends transversely between the side flanges 24 of bracket 21, and extends through an aligned bore and a lug 37 which extends rearwardly from the tubular member 38, the pivot permitting limited swinging movement of the tube, in accordance with distortion of the normally vertical portion 27 of the rod occasioned by variation of the angle of inclination of the accelerator pedal. The tube 38 has an elongated slot 39 in one side thereof, and an indicator pin 40 carried by the uppermost end of rod portion 27 extends outwardly through the slot. The pin 40 is adapted to coact with indicia or graduations 41 formed on the side of the slot 39.

A circular weight 42 is linearly movable in the tube 38, and is provided with an axial bore 43 through which rod portion 27 extends. A set screw 44 which extends outwardly through slot 39 and which is provided with an enlarged knurled head 45 extends through a threaded bore in the weight 42 into contacting relation with the rod portion 27. The arrangement is thus such that the relative position of the weight on vertical rod portion 27 may be readily varied, the weight being clamped in a selected position by means of the set screw 44.

From the foregoing the use and operation of the device should now be readily understandable. With the weight free to slide on rod 27 the accelerator may be employed in the conventional manner, being depressed as far as permissible, and when released allowed to return to idling position. In adjusting the device it is desirable that a predetermined speed be achieved, at which time the weight 42 will be resting at the bottom of tube 38 on plate 22. If the set screw is then tightened at this point, further depression of the accelerator beyond this predetermined desired speed is restricted. However, immediately upon release of the throttle, the weight is free to move upwardly in the tube as far as desired to completely relieve the pressure on the accelerator pedal. In the event that it is desired to change top speed it is merely necessary to rotate the head 45 to release the set screw, and readjust the weight at a desired position on the portion 27 of the rod.

From the foregoing it will now be seen that there is herein provided an improved throttle control, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A throttle control comprising a rod having a horizontal portion adapted to be pivotally connected to the accelerator pedal of a vehicle and a vertical portion, a tube support having an opening therein adapted to be attached to the interior of the vehicle adjacent the accelerator pedal, a tube pivotally mounted on said tube support, said vertical portion of said rod extending through said opening into said tube, a weight in said tube, said weight having a bore therein through which said rod extends and means for securing said weight at a selected point on said rod to limit the extent to which said rod can be moved, and hence limit the amount of depression which may be imparted to the accelerator pedal.

2. The structure of claim 1 wherein said tube has an elongated slot extending longitudinally thereof, and the means for securing said weight comprising a set screw engaging said rod through a threaded bore in said weight extending outwardly of the tube through said slot, said screw having an enlarged head thereon.

3. The structure of claim 2 wherein an indicator pin is positioned on said rod against the end of the vertical portion thereof, and extends through said slot to indicate the relative position of said end.

4. The structure of claim 3 wherein graduations are provided along the edges of said slot indicative of the position of said indicator pin.

References Cited by the Examiner

UNITED STATES PATENTS

| | | | |
|---|---|---|---|
| 2,381,390 | 8/1945 | Vanke | 74—526 |
| 2,906,141 | 9/1959 | Kocsi | 74—526 X |

MILTON KAUFMAN, *Primary Examiner.*